United States Patent
Kroener et al.

(10) Patent No.: US 9,767,073 B2
(45) Date of Patent: *Sep. 19, 2017

(54) ARITHMETIC OPERATION IN A DATA PROCESSING SYSTEM

(71) Applicant: INTERNATIONAL BUSINESS MACHINES CORPORATION, Armonk, NY (US)

(72) Inventors: Klaus M. Kroener, Boeblingen (DE); Christophe J. Layer, Grenoble (FR); Silvia M. Mueller, Boeblingen (DE); Kerstin Schelm, Boeblingen (DE)

(73) Assignee: International Business Machines Corporation, Armonk, NY (US)

(*) Notice: Subject to any disclaimer, the term of this patent is extended or adjusted under 35 U.S.C. 154(b) by 147 days.

This patent is subject to a terminal disclaimer.

(21) Appl. No.: 14/733,129

(22) Filed: Jun. 8, 2015

(65) Prior Publication Data

US 2015/0269121 A1 Sep. 24, 2015

Related U.S. Application Data

(63) Continuation of application No. 14/031,854, filed on Sep. 19, 2013, now Pat. No. 9,348,796.

(51) Int. Cl.
G06F 7/38 (2006.01)
G06F 17/10 (2006.01)
(Continued)

(52) U.S. Cl.
CPC ............. G06F 17/10 (2013.01); G06F 7/535 (2013.01); G06F 7/5375 (2013.01)

(58) Field of Classification Search
None
See application file for complete search history.

(56) References Cited

U.S. PATENT DOCUMENTS 5,870,323 A 2/1999 Prabhu et al.
6,109,777 A * 8/2000 Jouppi ................. G06F 7/5375
708/656
(Continued)

FOREIGN PATENT DOCUMENTS

EP 1672481 B1 12/2008
EP 2280340 B1 6/2012

OTHER PUBLICATIONS

Kornerup, Peter, "Digit Selection for SRT Division and Square Root", IEEE Transactions on Computers, vol. 54, No. 3, March 2005.
(Continued)

Primary Examiner — David H Malzahn
(74) Attorney, Agent, or Firm — Brian F. Russell; Steven L. Bennett (57) ABSTRACT

An arithmetic operation in a data processing unit, preferably by iterative digit accumulations, is proposed. An approximate result of the arithmetic operation is computed iteratively. Concurrently at least two supplementary values of the approximate result of the arithmetic operation are computed, and the final result selected from one of the values of the approximate result and the at least two supplementary values of the arithmetic operation depending on the results of the last iteration step.

10 Claims, 6 Drawing Sheets

(51) Int. Cl.
G06F 7/535 (2006.01)
G06F 7/537 (2006.01)

(56) References Cited

U.S. PATENT DOCUMENTS

| | | | |
|---|---|---|---|
| 6,751,645 B1 | 6/2004 | Gorshtein et al. | |
| 7,185,040 B2 | 2/2007 | Lee | |
| 7,809,784 B2 | 10/2010 | Lee | |
| 2004/0249877 A1 | 12/2004 | Gerwig et al. | |
| 2010/0281087 A1 | 11/2010 | Powell | |
| 2014/0101214 A1* | 4/2014 | Kroener | G06F 7/535 |
| | | | 708/201 |
| 2015/0269121 A1* | 9/2015 | Kroener | G06F 7/535 |
| | | | 708/201 |

OTHER PUBLICATIONS

Rust, Ingo et al., "A digit-set-interleaved radix-8 division/square root kernel for double-precision floating point." System on Chip (SoC), 2010 International Symposium on. IEEE, Sep. 2010.

* cited by examiner

ARITHMETIC OPERATION IN A DATA PROCESSING SYSTEM

PRIORITY CLAIM

This application is a continuation of U.S. Pat. No. 9,348,796 entitled "ARITHMETIC OPERATION IN A DATA PROCESSING SYSTEM," issued on May 24, 2016, the disclosure of which is incorporated herein by reference in its entirety for all purposes.

BACKGROUND

The present invention relates in general to data processing systems, and in particular, to a method and a system for performing an arithmetic operation, preferably by iterative digit accumulations, in a data processing unit.

Division, reciprocal, and square-root arithmetic operations decisively impact the performance of a data processing algorithm. These operations are usually performed using iterative algorithms such as the SRT (Sweeney, Robertson, and Tocher) algorithm, where result digits are computed sequentially using a given radix r (usually a power of 2). The result is computed iteratively, then eventually corrected, then eventually negated. The latter operations cannot be short-cut, since the need of a correction is detected in the last iteration of the computation. Accumulation of digits with MSD (Most Significant Digit) first to produce a final result usually produces carry information and requires the propagation of carries from one digit to the previous one.

Known solutions are to compute an intermediate result Q, and then run one more iteration to correct and/or negate. Another solution is to compute two intermediate results Q and Q−1, and then run one more iteration to negate eventually. The drawback of these solutions is that they include a supplementary iteration to correct and/or invert the final result. This supplementary iteration is described, for example, in U.S. Pat. No. 6,109,777.

EP 1,672,481 B1 describes an invention that relates to a division and square root arithmetic unit including a divider of a higher radix type and a square root extractor of a lower radix type. This patent describes how in designing a divider and a square root extractor, a device using a subtraction shift method or a subtraction separation method is generally employed to achieve a balance between performance and an amount of hardware required for implementation. This algorithm carries out a division by shifting a remainder or partial remainder and subtracting a multiple of a denominator (a divisor or a partially extracted square root) from the remainder to determine a quotient in a similar manner to a manual division calculation performed on paper. More specifically, a quotient or a number extracted from a square root is determined every n digits to calculate a partial remainder on the basis of the determined quotient or the extracted number from the square root. In the next operation step, the obtained partial remainder is shifted n digits to determine the next n-digit quotient or the square root extraction number on the basis of the n-digit shift of the partial remainder. Similarly, the operation is repeatedly performed.

A division and square root extraction processing of such algorithms is described, for example, in Kai Hwang, "High Speed Arithmetic System of Computers", 1980, Kindai Kagaku Sha Co., Ltd., pp. 214-249. This document discloses various division methods such as a restoring division, a non-restoring division, an SRT division and a generalized SRT division.

SUMMARY

It is an objective of the invention to provide a method and a data processing unit for performing an arithmetic operation in the data processing unit, preferably by iterative digit accumulations, where the method and data processing unit are optimized concerning execution performance and hardware resource consumption.

Another objective is to provide a system for performing an arithmetic operation in a data processing unit, preferably by iterative digit accumulations, comprising such a data processing unit.

These objectives are achieved by the features of the independent claims. The other claims, the drawings and the specification disclose advantageous embodiments of the invention.

According to a first aspect of the invention a method is proposed for performing an arithmetic operation in a data processing unit, preferably by iterative digit accumulations, comprising (i) computing iteratively an approximate result of the arithmetic operation, (ii) computing concurrently at least two supplementary values of the approximate result of the arithmetic operation, and (iii) selecting a final result from among a set including the approximate result and the at least two supplementary values of the arithmetic operation depending on the results of a last iteration step of the iterative computation.

According to the invention, a supplementary value Q−2 of the approximate result Q is additionally computed concurrently to the computation of Q and another supplementary value Q−1. This additional computation permits a direct selection of the final result which might be decremented and/or negated.

In particular, the invention relates to arithmetic operations, especially the accumulation of digits with MSD (Most Significant Digit) first using a given radix r (usually a power of 2) in data processing units. As one embodiment, the arithmetic operation realized by the innovative method can be a so-called SRT computation process. The SRT method is an iterative method which uses lookup tables to determine digit values, which are used for computation of a result. The innovative method described here is especially adapted for using such a digit-wise accumulation process for determination of the result.

As an advantageous embodiment, the computations of quotients using SRT algorithms is addressed. However, the invention is not restricted to such a division algorithm. Square-root operations may also be realized with the SRT algorithm. Other arithmetic operations employing digit-wise accumulation are specially suited to be used too.

The SRT division method is an iterative method similar to a non-restoring division, but it uses a lookup table based on the dividend and the divisor to determine quotient digit values. The SRT iteration formula for computing a partial remainder P is:

$$\forall i \geq 0, P_{i+1} = r*P_i - q_{i+1}*D \tag{1}$$

where i is an iteration step, r is a radix (usually 4, 8, 10 or 16), $P_i$ is a partial remainder, D is a normalized constant denominator, and $q_i$ is a guessed quotient digit value. For simplification the index i is only used in the following description where a specific iteration step is addressed; otherwise the indices of the respective values are omitted.

The determination of quotient values $Q_i$ thereby is as follows:

$$Q_{i+1} = Q_i + q_{i+1}*r^{-i+1}, \text{ with } q_0=0 \text{ and } Q_0=0 \tag{2}$$

There are different methods to accumulate the quotient digit values $q_i$. In the invention the following method, also called an extended carry-less digit-wise accumulation, is used:

The q digit values are gathered in a Q and in a $Q'=Q-1$ data register in combination with $q'=q-1$ digit values. Finally, the correct result will either be in the Q or the Q' register. A supplementary iteration may be performed to correct and/or negate the result eventually. In the innovative method, a $Q''=Q-2$ is computed in using $q''=q-2$ digit values in combination with Q and Q', which will be described in detail hereafter. The innovative method shows the advantage that the last correction of the result in the SRT division process may be performed by decrementing a quotient value Q for a negative remainder directly by selecting the appropriate Q' or Q'' data register for output. Another advantage is that a potential inversion of the quotient value due to the signs of the dividend and divisor of the SRT division process may be achieved by a two's complement notation: $-Q-1-\overline{Q-1}+1-\overline{Q-2}$.

A further advantage of the innovative method is that one iteration may be saved for the correction of the quotient in SRT division, and another iteration may be saved for the negation of the result, because especially for SRT operations, the correct result can be obtained by selecting one of the Q, Q' or Q'' data registers.

Favorably the innovative method may comprise the following steps: (i) computing iteratively an approximate result Q of the arithmetic operation by accumulating digit values q concatenated to a previous partial result Q using a given radix r, (ii) computing iteratively at least two supplementary values of the approximate result, Q-1 and Q-2, of the arithmetic operation by accumulating digit values q-1 and q-2, respectively, concatenated to previous supplementary values Q-1 and Q-2 using the given radix r, (iii) computing concurrently a partial remainder value P of the arithmetic operation, (iv) selecting as a final result of the arithmetic operation one of the following. (iva) In case P is greater or equal to zero and Q is greater or equal zero, the last iterated value of Q will be selected. (ivb) In case P is less than zero and Q is greater or equal zero, the last iterated value of Q-1 will be selected. (ivc) In case P is greater or equal zero and Q is less than zero, the negated last iterated value of Q-1 will be selected and (ivd) in case P is less than zero and Q is less than zero, the negated last iterated value of Q-2 will be selected as the final result.

In such a manner the final correction and/or negation steps of a usual SRT division process may be omitted because the final result may be directly selected from already computed values Q, Q-1, or Q-2 of the last iteration step.

Favorably the absolute value of a digit value q is less than the radix r, which is a convenient definition in such iterative digit accumulations, depending on the computing accuracies chosen.

According to another embodiment of the invention the method may further comprise the step of selecting the final result of the arithmetic operation by using a multiplexing unit, which may have the result and the at least two supplementary values as an input. Using a multiplexing unit as a selection tool may simplify and accelerate the selection process of the final result.

Particularly the method may be used with the multiplexing unit connected to at least two hardware lines for input of sign signals controlling the selecting process of the final result, which is a very efficient way of directly selecting the appropriate input of the multiplexer as an output for the final result.

According to a another aspect of the invention a data processing unit for performing the innovative method comprises two data registers for concurrently computing the approximate result and the at least two supplementary values of the arithmetic operation. The combination of using only two registers for doing digit-wise accumulations to compute an approximate result and at least two supplementary values by the innovative method enables great hardware efficiency. Additionally, only a register with a limited number of $\log_2(r)$ bits to store the value q-1 or q-1+r may be implemented, which for a given radix of 4 is only 2 bits.

The proposed method may further be advantageously extended to compute any kind of result of the form Q±n, where n is a natural number. The invention may be implemented in using almost no supplementary hardware. Advantage will be taken from the fact that usually only Q, Q-1 and Q-2 are needed for correction and/or negation of the final result. The method can employ only two full length data registers and additionally costs only n $\log_2(r)$-bit registers to store the $q_i$-n digit values.

Advantageously there is no complex logic, and no additional arithmetic operation is needed. So the disclosed implementations represent a very simple and straightforward method for iterative digit accumulation in computing quite a number of arithmetic processes such as division, square-root extraction, addition, subtraction, multiplication.

Favorably a multiplexing unit may be used for selecting the final result of the arithmetic operation, having the approximate result and the at least two supplementary values as an input. Using a multiplexing unit as a selection tool may simplify and accelerate the selection process of the final result.

Advantageously the multiplexing unit may be connected to at least two hardware lines for input of sign signals controlling the selecting process of the final result, which is a very efficient way of directly selecting the appropriate input of the multiplexer as an output for the final result.

In a further advantageous aspect of the invention a data processing program is proposed for execution in a data processing system, comprising an implementation of an instruction set for performing a method as described above when the data processing program is run on a computer.

Further a computer program product comprising a computer usable medium including a computer readable program is proposed, wherein the computer readable program when executed on a computer causes the computer to perform a method comprising the steps of computing iteratively an approximate result of the arithmetic operation, computing concurrently at least two supplementary values of the approximate result of the arithmetic operation, and selecting the final result from one of the values of the approximate result and the at least two supplementary values of the arithmetic operation depending on the results of the last iteration step.

As will be appreciated by one skilled in the art, aspects of the present invention may be embodied as a system, method or computer program product. Accordingly, aspects of the present invention may take the form of an entirely hardware embodiment, an software embodiment (including firmware, resident software, micro-code, etc.) or an embodiment combining software and hardware aspects that may all generally be referred to herein as a "circuit," "module" or "system."

Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Rash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to block diagrams of methods, apparatus (systems) and computer program products according to embodiments of the invention. It will be understood that each block of the flowchart illustrations and/or block diagrams, and combinations of blocks in the block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the block diagram block or blocks.

Due to a further aspect of the invention, a data processing system for execution of a data processing program is proposed, comprising software code portions for performing a method described above.

BRIEF DESCRIPTION OF THE SEVERAL VIEWS OF THE DRAWINGS

The present invention together with the above-mentioned and other objects and advantages may best be understood from the following detailed description of the embodiments, but not restricted to the embodiments, wherein is shown in.

DETAILED DESCRIPTION

In the drawings, like elements are referred to with like reference numerals. The drawings are merely schematic representations, not intended to portray specific parameters of the invention. Moreover, the drawings are intended to depict only typical embodiments of the invention and therefore should not be considered as limiting the scope of the invention.

Figure 1:
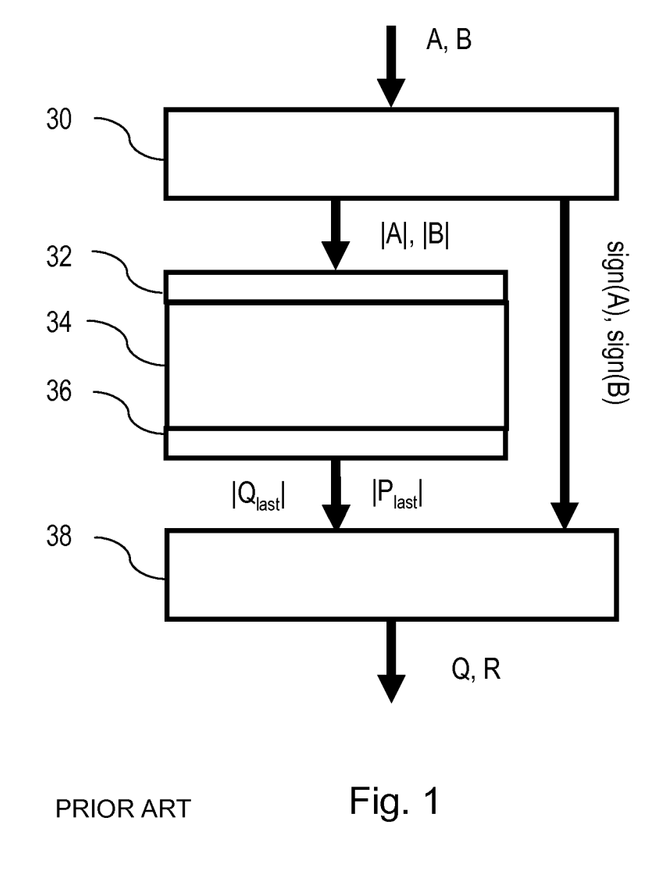
FIG. 1 a generalized process flow of an SRT division process according to the state of the art.

In FIG. 1 a generalized process flow of an SRT division process according to the state of the art is shown. The example depicts a fixed-point division process for determining a quotient Q as well as a remainder R by calculating a value A divided by a value B. First a pre-processing process 30 is done to determine the absolute values of both input values A and B. Then a normalizing process 32 takes place before the iterative SRT division process 34 starts with the absolute values |A| and |B|.

Iterative algorithms such as an SRT division process can be described according to the following formulas for iterated quotient values $Q_i$, which are expressed for the example of a fixed-point right aligned division process as:

$\forall i \geq 0, Q_{i+1} = r * Q_i + q_{i+1} = \sum_{n=0}^{i+1} q_n * r^{i+1-n}, Q_0 = 0, q_0 = 0$ (3)

and for the example of a floating point left aligned division process:

$\forall i \geq 0, Q_{i+1} = Q_i + q_{i+1} * r^{-(i+1)} = \sum_{n=0}^{i+1} q_n * r^{-n}, Q_0 = 0, q_0 = 0$ (4)

where i is an iteration step, r a radix (usually 4, 8, 10 or 16), $P_i$ is a partial remainder, D a constant denominator and $q_i$ a guessed quotient digit value. Equation (4) thereby corresponds to the already shown equation (2) and exhibits a more detailed description.

Quotient digit values $q_i$ can be determined according:

$\forall i \geq 0, q_{min} \leq q_i \leq q_{max}$ (5)

with usually, but not necessarily $-q_{min} = q_{max} < r$ whereby the partial remainder value $P_i$ may be determined according already shown equation (1):

$\forall i \geq 0, P_{i+1} = r * P_i - q_{i+1} * D$ (1)

After having the result of the division process 34 a denormalizing process 36 delivers absolute values of the last iteration step for a quotient $|Q_{last}|$ and a partial remainder $|P_{last}|$. A final post-processing step 38 corrects and/or negates the result according to the signs of A and B, which are transferred from the pre-processing step 30, and delivers the final results for the quotient Q and the remainder R. One advantage of the invention is that the final post-processing step 38 may be eliminated because the determination of the final results Q and R can be selected directly from the last iteration step values.

Figure 2:
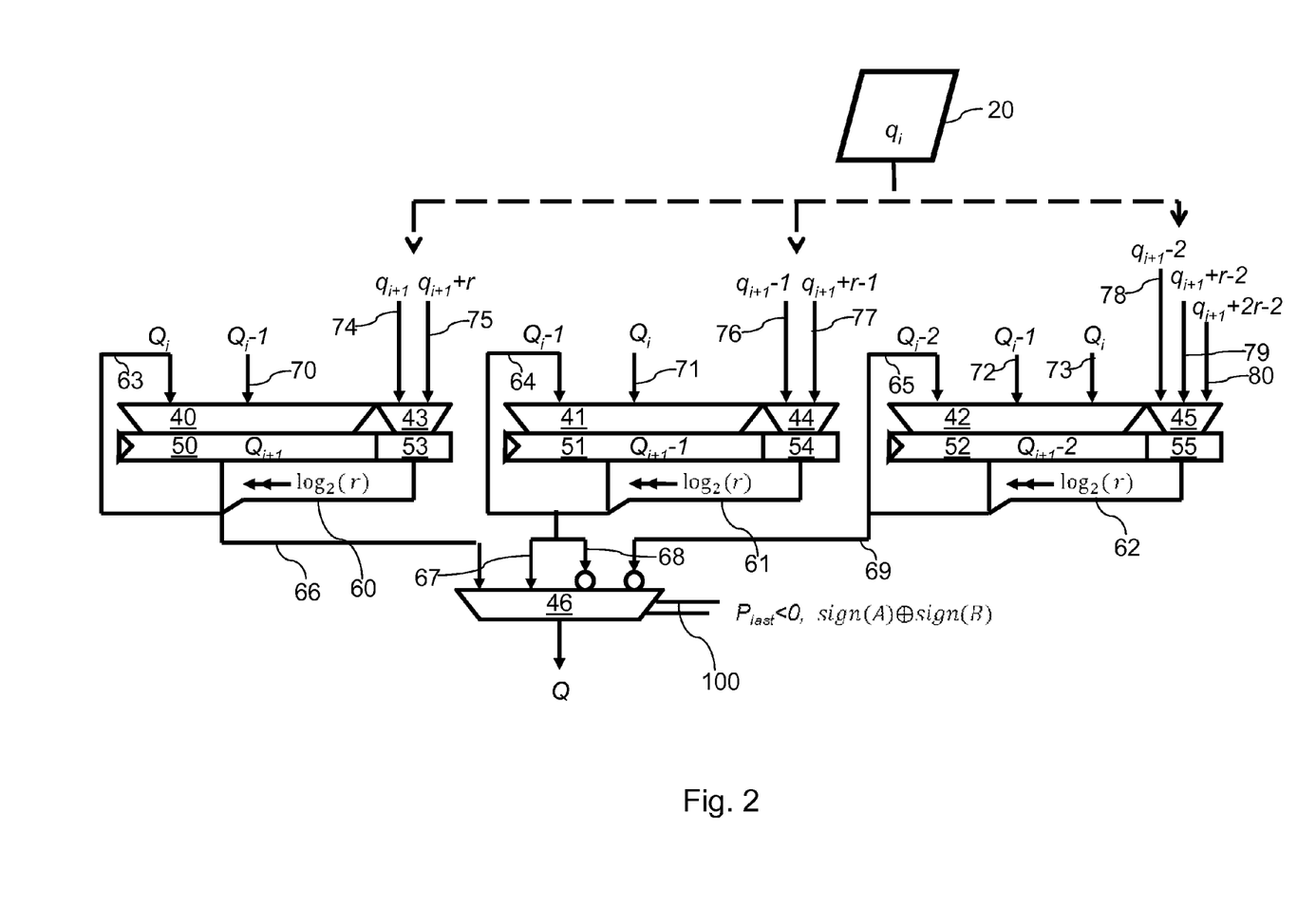
FIG. 2 an example embodiment of an SRT division process with extended carry-less digit-wise accumulation according to the invention.

FIG. 2 shows an example embodiment of an SRT division process with extended carry-less digit-wise accumulation according to the invention. The iterative computation of the different quotient values Q, Q−1 and Q−2 specific for the innovative process is performed according to the following formulas.

An iterative value for the guessed quotient value Q, is computed according equation (3), because a fixed point right aligned division process is described here:

$\forall q_{i+1}, Q_{i+1} = r * Q_i + q_{i+1} =$ $\sum_{n=0}^{i+1} q_n * r^{i+1-n} \begin{cases} \forall q_{i+1} \geq 0, & Q_{i+1} = r * Q_i \| q_{i+1} \\ \forall q_{i+1} < 0, & Q_{i+1} = r * (Q_i - 1) \| (q_{i+1} + r) \end{cases}$ (3)

where the symbol ∥ characterizes a concatenation step with a left shift by $\log_2(r)$ bits, e.g. for radix 4, a left shift by 2 bits.

The quotient value Qi−1 is computed like this:

$\forall q_{i+1}, Q_{i+1} - 1 = r * Q_i + (q_{i+1} - 1) = \sum_{n=0}^{i+1} q_n * r^{i+1-n} -$ $1 \begin{cases} \forall q_{i+1} \geq 1, & Q_{i+1} - 1 = r * Q_i \| (q_{i+1} - 1) \\ \forall q_{i+1} < 1, & Q_{i+1} - 1 = r * (Q_i - 1) \| (q_{i+1} + r - 1) \end{cases}$ (6)

whereas for the quotient values $Q_i$−2 the following formula applies:

$\forall q_{i+1}, Q_{i+1} - 2 = r * Q_i + (q_{i+1} - 2) = \sum_{n=0}^{i+1} q_n * r^{i+1-n} - 2$ (7)

-continued $\begin{cases} \forall 2 \leq q_{i+1} < 2 + r, & Q_{i+1} - 2 = r * Q_i \| (q_{i+1} - 2) \\ \forall 2 - r \leq q_{i+1} < 2, & Q_{i+1} - 2 = r * (Q_i - 1) \| (q_{i+1} + r - 2) \\ \forall 2 - 2r \leq q_{i+1} < 2 - r, & Q_{i+1} - 2 = r * (Q_i - 2) \| (q_{i+1} + 2r - 2) \end{cases}$ In FIG. 2 mainly three data registers 50, 51, 52 are shown for the computation of the different quotient values Q, Q−1 and Q−2. For simplicity the indices of the different Q values are omitted in the description, where appropriate. The input to these registers 50, 51, 52 is done by appropriate multiplexing units 40, 41, 42, respectively. As the SRT process is a recursive process the output of the different registers 50, 51, 52 is fed back via data lines 63, 64, 65 to the input of the multiplexing units 40, 41, 42 in order to compute a new iteration step. Additionally Q−1 is an input to multiplexing unit 40 via data line 70, whereas Q is an input to multiplexing unit 41 via data line 71, and both Q and Q−1 are an input to multiplexing unit 42 via data lines 73 and 72, respectively. Additionally quotient digit values q, q+r, q−1, q+r−1, q−2, q+r−2, q+2r−2, which are results from guesses from a lookup table 20, are fed to multiplexing units 43, 44, 45 via data lines 74, 75, 76, 77, 78, 79, 80, respectively. The q values are stored in data registers 53, 54, 55 for starting a concatenating process. The selection of the appropriate values in the multiplexing units 40 to 45 is performed according to the formulas for the computation of Q, Q−1, Q−2 given above. In order to proceed the iteration process to the next step, for example, the q value form register 53 is concatenated with the output of register 50, i.e. left shifted by $\log_2(2)$ bits via data line 60, and the result fed back as an input to multiplexing units 40, 41 42. Similarly the concatenation processes are performed with the other two register units 51 and 54 via data line 61 and 52 and 55 via data line 62. The results of the iteration process finally after the last iteration step are fed to multiplexing unit 46 via data lines 66 for Q and data lines 67 and 68 for Q−1. Data lines 68 and 69 delivers Q−1 and Q−2 to negated input ports of multiplexing unit 46. The final result of the quotient Q can then be determined by multiplexing unit 46 selecting from the results of the last iteration step according to the following formulas:

$P_{last} > 0 \wedge Q_{last} > 0, \Rightarrow Q = Q_{last}$ $P_{last} > 0 \wedge Q_{last} \geq 0, \Rightarrow Q = (Q_{last} - 1)$ $P_{last} > 0 \wedge Q_{last} < 0, \Rightarrow Q = -(Q_{last}) = \overline{(Q_{last} - 1)}$ $P_{last} > 0 \wedge Q_{last} < 0, \Rightarrow Q = -(Q_{last}) = (Q_{last} - 1) = \overline{(Q_{last} - 2)}$ (8)

In case P is greater or equal to zero and Q is greater or equal zero, the last iterated value of Q will be selected. In case P is less than zero and Q is greater or equal zero, the last iterated value of Q−1 will be selected. In case P is greater or equal zero and Q is less than zero, the negated last iterated value of Q−1 will be selected; and in case P is less than zero and Q is less than zero, the negated last iterated value of Q−2 will be selected as the final result. In such a manner the final correction and/or negation steps of a usual SRT division process may be neglected, because the final result may be directly selected from already computed values Q, Q−1, or Q−2 of the last iteration step.

Besides the inputs from the data lines 66 to 69 for Q, Q−1, −(Q−1), and −(Q−2), multiplexing unit 46 additionally has at least two hardware input lines 100 which feed an input signal for $P_{last} < 0$ and the exclusive-or input of sign(A)⊕sign(B), where A and B are the dividend and divisor of the SRT division process as defined above. The partial remainder values P are computed in a parallel process according to the formula given above. By this method the final result correction and/or negation step can be eliminated and can be replaced by a simple and fast selection step in the multiplexing unit 46.

Figure 3:
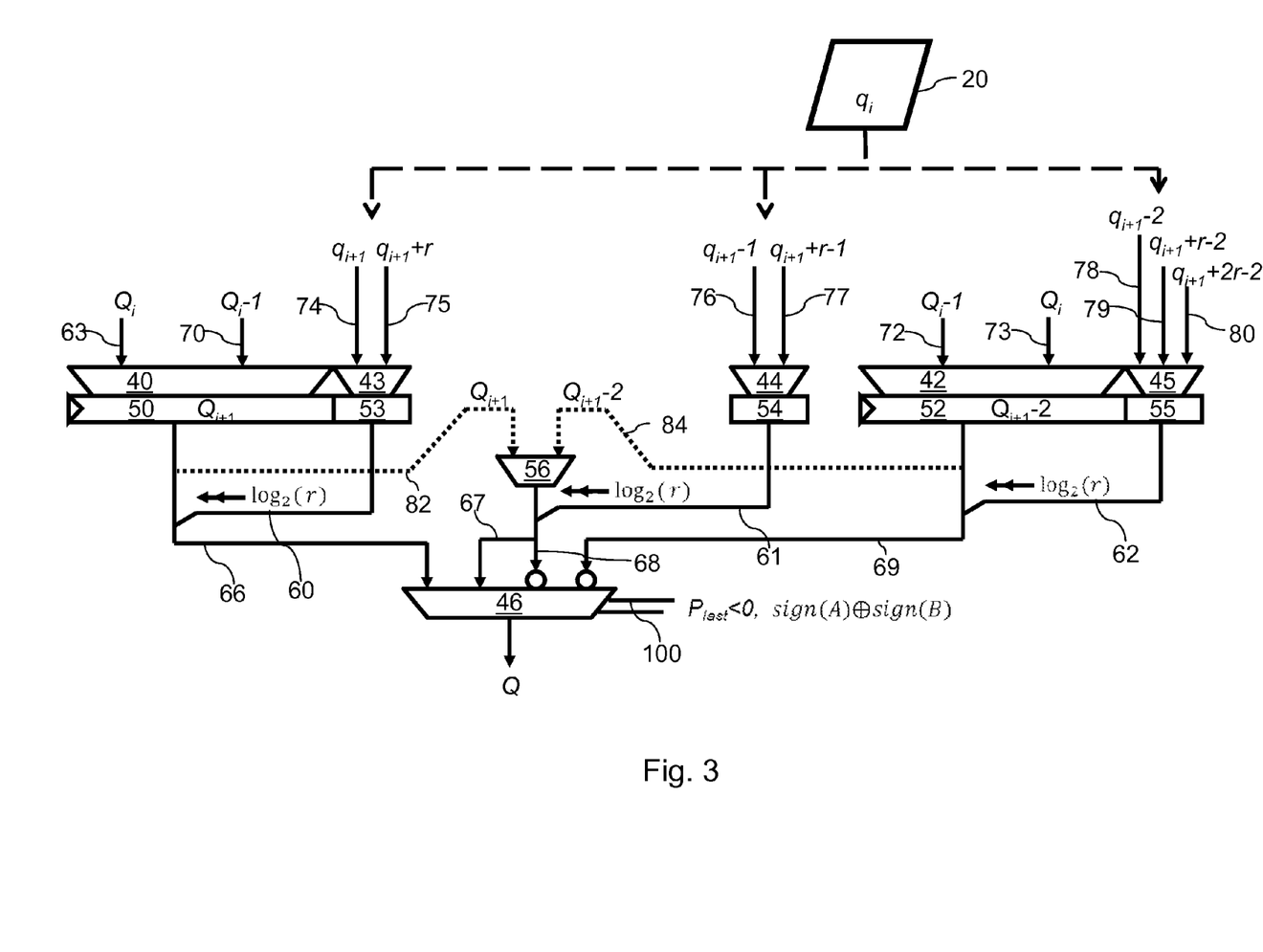
FIG. 3 an implementation with two data registers of an SRT division process according to the exemplary embodiment of FIG. 2.

In FIG. 3 an implementation of an SRT division process according to the example embodiment of FIG. 2 is described. A further advantage of the described method is that only two data registers 50 and 52 are sufficient to handle the iteration process. The data register for the Q−1 computation may be eliminated because this value is available either in data register 50 from the last Q value or in data register 52 from the last Q−2 value respectively. Therefore, an additional data line 82 from data register 50 as well as an additional data line 84 from data register 52 are fed to a multiplexing unit 56 which selects the appropriate value Q−1 for input to the multiplexing unit 46. In this way, only two full data registers 50 and 52 are sufficient to cover the iteration process, in addition to the small register 54 with a bit length of $\log_2(r)$ and an additional multiplexing unit 56, which is a very hardware-efficient implementation of such a process. For simplicity not all data lines are shown compared to FIG. 2, but all other functions are meant as described in FIG. 2.

The embodiment shown in FIGS. 2 and 3 is the example of an SRT division process. Yet the method is not restricted to such a process, but instead is applicable to any iterative method for computation of a number with digit-wise accumulations, e.g., computation of square-roots or generally other processes including addition, subtraction, or multiplication.

Figure 4:
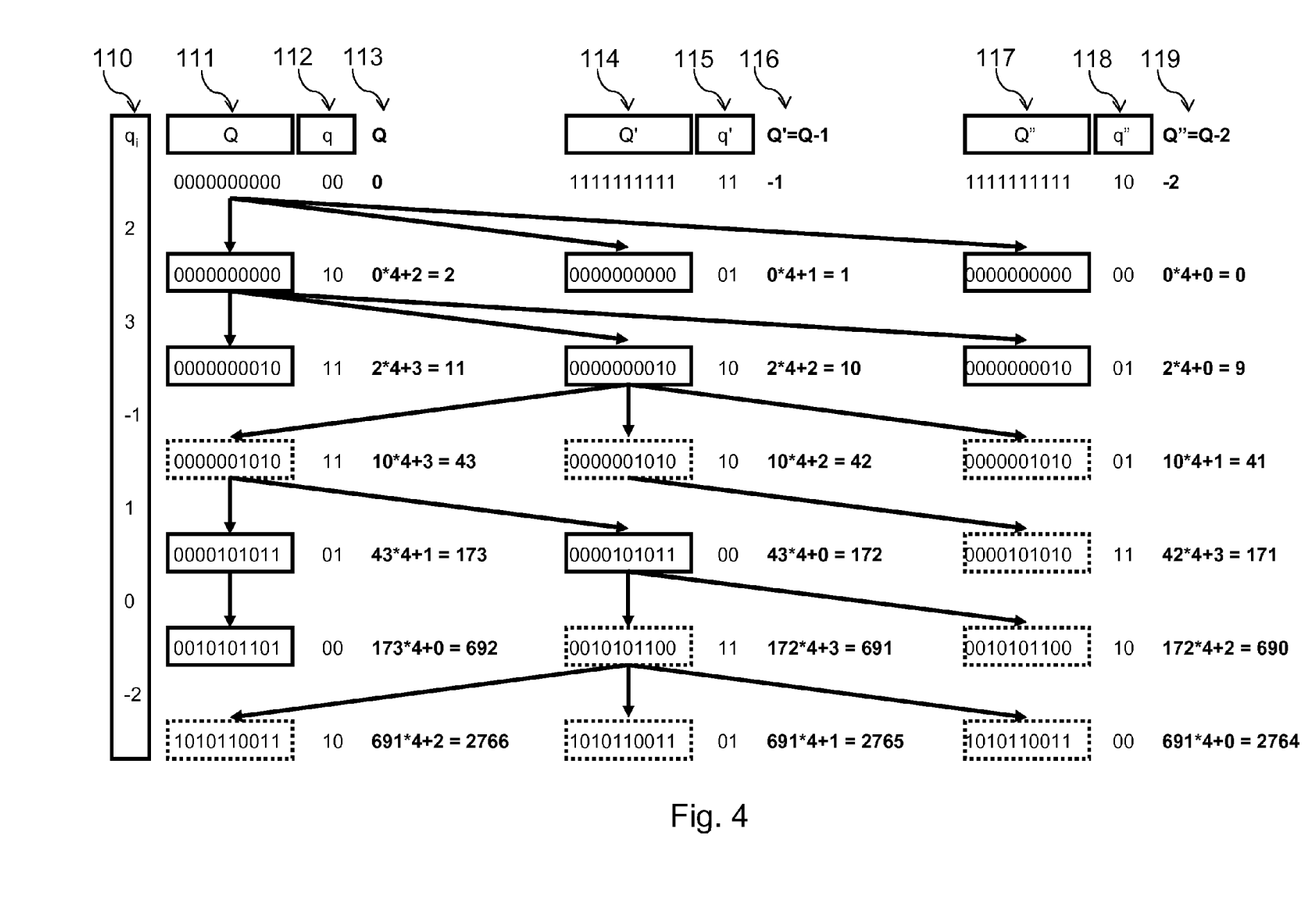
FIG. 4 depicts an exemplary embodiment according to FIG. 2 with three data registers.

In FIG. 4 a numeric example of an embodiment according to FIG. 2 with three data registers is shown in order to explain the method in more detail with real numbers. Column 110 shows different $q_{i+1}$ quotient digit values according to an implementation of the inventive method with an SRT division process with radix 4. As given above $q_{i+1}$ may be determined according to $-r < q_{i+1} < r$, which means that $q_{i+1}$ can range from −3 to 3 (−3 is not used in the example shown). Column 111 shows a data register with the computed quotient values for Q, column 114 shows a data register for Q'=Q−1, and column 117 shows a data register for Q"=Q−2. The values are determined according to the equations $$Q_{i+1} = r * Q_i + q_i$$

$$Q'_{i+1} = r * Q'_i + q'_i$$

$$Q''_{i+1} = r * Q''_i + q''_i$$

where $q'_{i+1} = q_{i+1} - 1$ and $q''_{i+1} = q_{i+1} - 2$. The columns 112, 115, 118 represent the data registers with the values of q, q', q", respectively, in digits (indices are omitted). Columns 113, 116, 119 show the respective values of Q, Q', Q" in decimal representation. As a starting point, Q value 111 and q value 112 are set to zero. Then according to the first $q_{i+1}$ value 110 of 2, a new set of quotient values are computed according to equation (9). Afterwards the iteration proceeds with the next $q_{i+1}$ value 110 and so on, until an appropriate accuracy is achieved. In FIG. 4 the quotient values that are derived from the previous Q values 111 are boxed with a continuous line, whereas the quotient values that are derived from the previous Q' values 114 are boxed with a dashed line.

Figure 5:
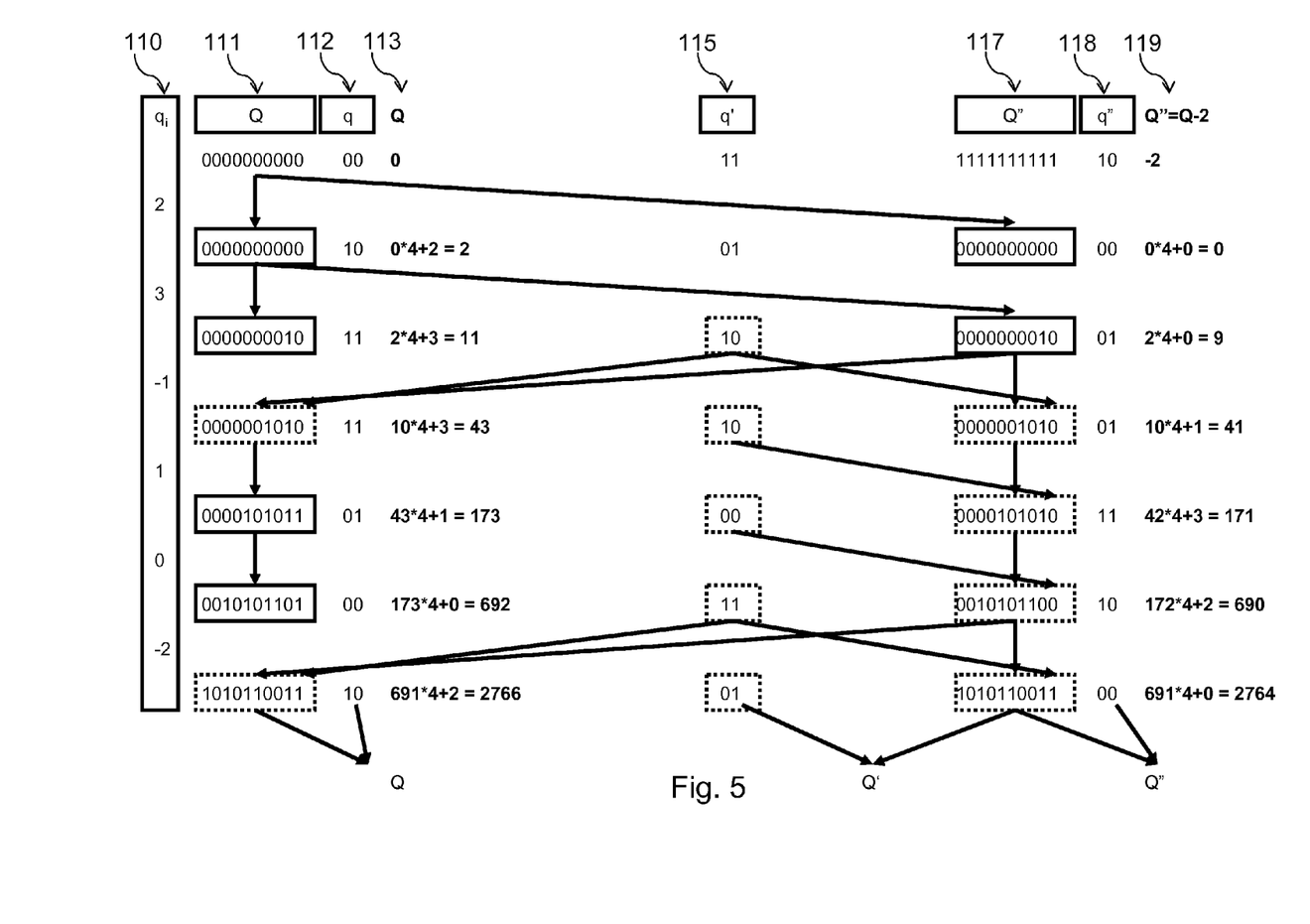
FIG. 5 depicts an exemplary embodiment according to FIG. 3 with only two data registers.

FIG. 5 shows the same numeric example of an embodiment with a preferred implementation according to FIG. 3 with only two data registers. In FIG. 5, the data register with the Q' values 114 is omitted. As can be seen in the example the same result can be obtained with feeding the data registers for Q 111 and Q" 117 with the appropriate value for Q', which is available either in a previous Q 111 or a Q" 117 data register. Only the two-bit data register 115 for the q' values is needed for implementation of the described method. The same notation for continuous and dashed boxes as in FIG. 4 are employed, continuous lines for quotient values derived from previous Q values and dashed lines for quotient values derived from previous Q' values. As can be seen in the end the same values for the quotient values may be obtained by this implementation.

Figure 6:
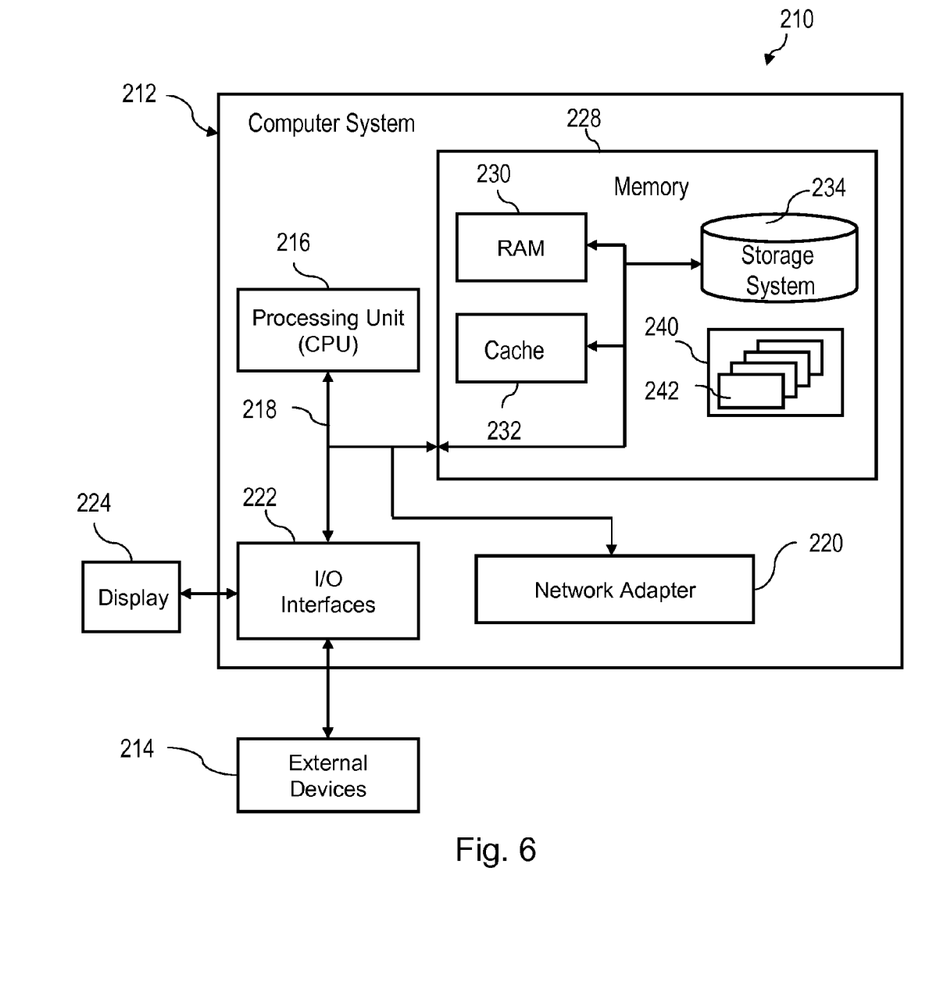
FIG. 6 depicts an exemplary embodiment of a data processing system for carrying out a method according to the invention.

Referring now to FIG. 6, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210 there is a computer system/server 212, which is operational with numerous other general purpose or special purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein. Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I10) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical functions. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

What is claimed is:

1. A method for performing an arithmetic operation in a data processing unit, the method comprising:
   the data processing unit iteratively computing an approximate result of the arithmetic operation;
   concurrently with the iteratively computing, the data processing unit computing at least two supplementary values of the approximate result of the arithmetic operation; and
   the data processing unit selecting a final result of the arithmetic operation from among a set including the approximate result and the at least two supplementary values depending on a result of a last iteration of the iteratively computing.

2. The method according to claim 1, wherein the arithmetic operation is an SRT (Sweeney, Robertson, and Tocher) computation process.

3. The method according to claim 1, wherein the arithmetic operation is a division operation.

4. The method according to claim 1, wherein the arithmetic operation is a square-root operation.

5. The method according to claim 1, wherein the arithmetic operation is one of an addition, a subtraction, or a multiplication operation.

6. The method according to claim 1, wherein:
   the iteratively computing the approximate result comprises iteratively computing an approximate result Q of the arithmetic operation by accumulating digit values q concatenated to a previous approximate result Q using a given radix r;
   computing at least two supplementary values comprises computing iteratively the at least two supplementary values of the approximate result, Q−1 and Q−2, by accumulating digit values q−1 and q−2, respectively, concatenated to previous supplementary values Q−1 and Q−2 using the given radix r;
   the method further comprises computing concurrently a remainder value P of the arithmetic operation;
   the selecting the final result comprises:
      in response to P being greater than or equal to zero and Q being greater than or equal to zero, selecting as the final result a value of Q for the last iteration;
      in response to P being less than zero and Q being greater than or equal to zero, selecting as the final result a value of Q−1 for the last iteration;
      in response to P being greater than or equal to zero and Q being less than zero, a negation of a value of Q−1 for the last iteration; and
      in response to P being less than zero and Q being less than zero, selecting as the final result a negation of a value of Q−2 for the last iteration.

7. The method according to claim 6, and further comprising selecting the digit values q from a lookup table.

8. The method according to claim 6, wherein an absolute value of the digit values q is less than the radix r.

9. The method according to claim 1, wherein selecting the final result comprises selecting the final result using a multiplexing unit having the approximate result and the at least two supplementary values as inputs.

10. The method according to claim 9, wherein the selecting the final result includes the multiplexing unit selecting the final result in response to at least two hardware lines indicating operand signs.

* * * * *